May 16, 1950
M. M. CANNON, JR
2,508,222
WATER-COOLED SKIMMER BLOCK FOR MOLTEN
GLASS FLOW CHANNELS
Filed June 29, 1948
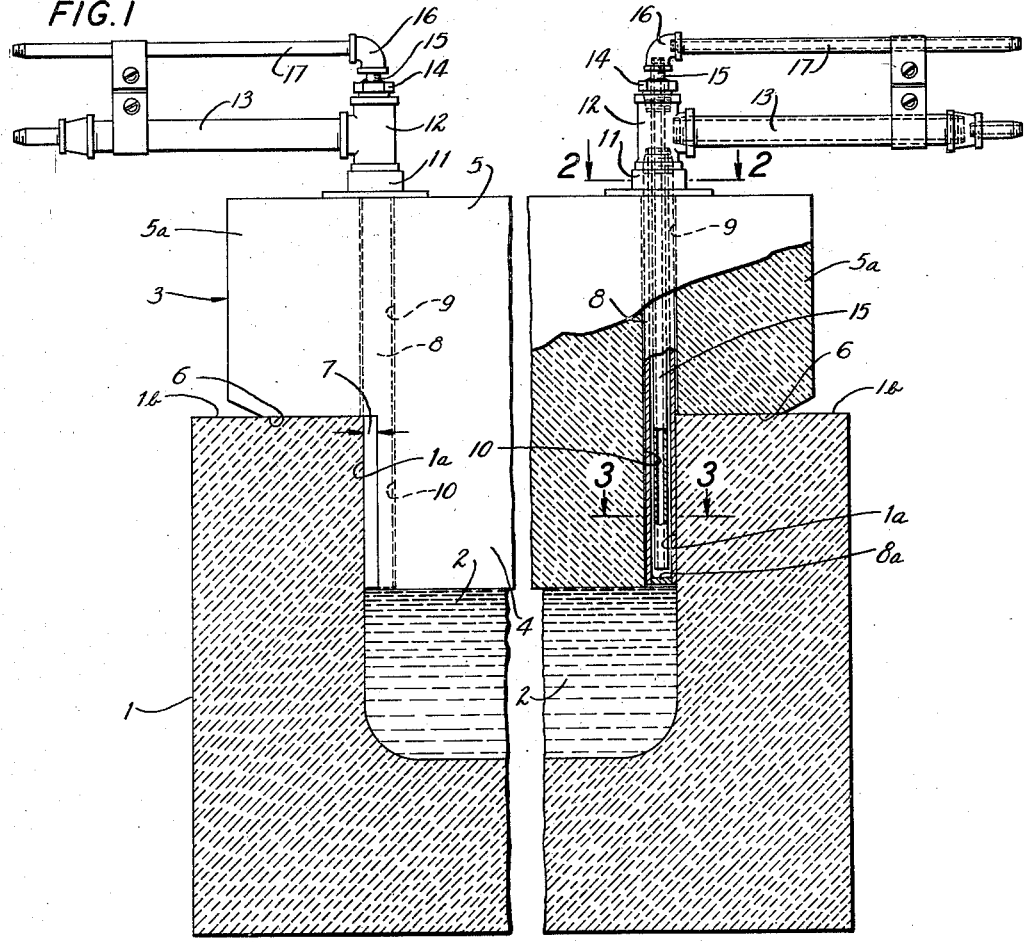
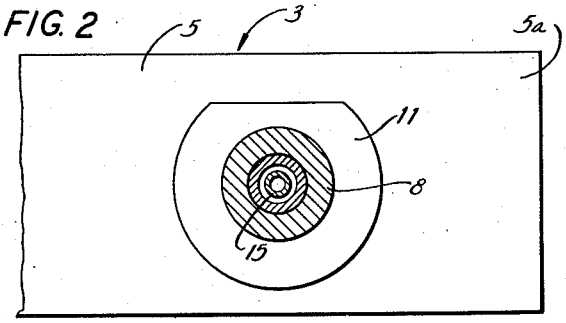
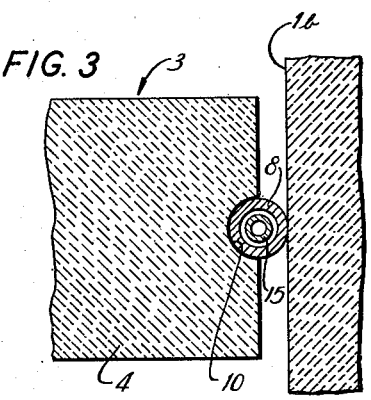
INVENTOR
MADISON M. CANNON JR.
BY Parham & Bates
ATTORNEYS Patented May 16, 1950

2,508,222

UNITED STATES PATENT OFFICE 2,508,222

WATER-COOLED SKIMMER BLOCK FOR MOLTEN GLASS FLOW CHANNELS

Madison M. Cannon, Jr., West Hartford, Conn., assignor to Hartford-Empire Company, Hartford, Conn., a corporation of Delaware Application June 29, 1948, Serial No. 35,827

5 Claims. (Cl. 49—54)

This invention relates to improvements in skimmers for molten glass flow channels, such as glass feeder forehearths and the like.

A refractory skimmer block customarily is positioned transversely of a molten glass flow channel of a feeder forehearth so as to stop the flow of any foreign or unhomogeneous matter on the surface of the glass stream and also to separate the space above the glass stream at the upstream side of the skimmer block from that at the downstream side thereof. The location of such a skimmer block in a forehearth channel may be at or near the junction of the channel with a melting tank with which it is operatively connected so as to exclude furnace gases from the space above the glass in the forehearth channel.

While the portion of a skimmer block that depends in a flow channel may be sufficiently wide to come close to the side walls of the flow channel, sufficient clearance is necessary to permit such a skimmer block to be lowered to its operative position and to be removed for replacement when worn or broken. For this reason and because of normal variations in the specific dimensions of different generally similar skimmer blocks and of different glass flow channels, some flow of molten glass would take place between the vertical end faces of a skimmer block and the side walls of a channel in which such a skimmer block had been operatively positioned. The moving glass would soon wear away the end faces of the contacted portion of the skimmer block and further would wear and erode the side walls of the flow channel next to the skimmer block, causing grooves or depressions therein. Such a worn skimmer block soon became unsuitable for use and required replacement. If the wear on the side walls of the channel had resulted in grooves or depressions therein, replacement of the worn skimmer block by a new and intact one would not provide a desirably tight seal or baffle in the channel.

An object of the present invention is to obviate erosion by glass of the stream of the vertical faces or side edges of the glass-contacting portion of the skimmer block in a flow channel and also to prevent erosion or wear by the glass of the channel side walls next to the skimmer block, thereby appreciably prolonging the useful life of a skimmer block and making it possible to restore the original tight condition in a channel by the installation of a new skimmer when the previous one has been worn or broken or otherwise rendered unfit for use.

In carrying out the present invention, I provide coolers at the vertical end faces or side edges of the portion of a refractory skimmer block which is to depend in a glass flow channel to or below the surface of a glass stream therein. These coolers provide for circulation of a cooling fluid, as water, therethrough and by their cooling action on the glass between the side edges or end face portions of the skimmer block and the adjacent vertical side walls of the forehearth channel "freeze," i. e., locally stop flow of such glass, thereby obviating erosion of and wear on the contacting refractory parts.

The coolers are separable from the skimmer block and may be removed therefrom when removal of the skimmer block is required. After their removal, the skimmer block may be left in place until the previously frozen glass has reheated sufficiently to free itself from the skimmer block which then may be withdrawn in the usual manner.

Further objects and advantages of the invention hereinafter will be pointed out or will be obvious from the following description of a practical embodiment of the invention as illustrated in the accompanying drawings, in which Fig. 1 is a view, mainly in transverse vertical section and partly in elevation, of a molten glass flow channel with a skimmer block equipped with slide edge coolers shown in place therein;

Fig. 2 is a relatively enlarged section through one of two similar side edge coolers with which the skimmer block is supplied, the section being along the line 2—2 of Fig. 1; and Fig. 3 is a fragmentary section along the line 3—3 of Fig. 1.

In Fig. 1, a refractory molten glass flow channel I contains a stream 2 of molten glass. A skimmer, generally designated 3, comprises a refractory block having a substantially rectangular lower portion 4 depending between the inner side walls $1a$ of the flow channel and a wider upper portion 5 having similar oppositely extending wings $5a$ formed to provide downwardly facing shoulders 6 adapted to rest flatwise on upper surfaces $1b$ of the channel side walls, whereby the lower portion 4 of the refractory skimmer block depends in the flow channel to the desired level therein, as with its lower edge at or a predetermined distance below the surface of the glass stream.

The width of the lower portion 4 of the forehearth block is sufficiently less than the width of the flow channel between its inner side walls $1a$ to provide like predetermined spaces, such as that indicated at 7 at the left hand side of the portion 4 of the skimmer block in Fig. 1. This space may be predetermined in view of the size of a vertical cooling pipe, indicated at 8, which it is desired to use. For example, the cooling pipe 8 may have a diameter of one inch, in which event the space 7 appropriately may be approximately one-half inch in width. The cooling pipe 8 extends through an appropriately sized vertical bore 9 in the wider upper portion 5 of the refractory block and also is one-half imbedded in a half-round or semi-circular vertical groove 10 which is provided in the vertical end face or side edge of the lower portion 4 of the refractory skimmer block as a downward continuation of the vertical bore 9, the axis of which is in the plane of such end face or side edge of the skimmer block portion 4. The pipe 8 is closed at its lower end, as indicated at 8a, in the right hand portion of Fig. 1, and is of sufficient length to extend to or near the level of the lower end of the skimmer block when the upper end portion of such pipe is supported, as by a conventional pipe flange 11, on the top of the skimmer block. The upper end portion of the pipe 8 may pass through such a flange and be screwed into a pipe fitting, shown as a T designated 12, which rests upon the flange 11 and constitutes a means for connecting the pipe 8 operatively to both a horizontal pipe 13 and a vertical bushing 14. As shown, the bushing 14 is secured on pipe 15, as by being welded or brazed thereto, and is located in line with the upper end of the pipe 8 while the pipe 13 communicates with the interior of the T 12 above the level of the upper end of such pipe. The bushing 14 serves in a conventional manner to support the inner pipe 15 within the pipe 8 and in spaced relation thereto and also to connect the upper end of this inner pipe with a suitable pipe fitting, such as an elbow 16, by which communication is established between the inner pipe 15 and a second horizontal pipe 17. The inner pipe 15, which is open at its lower end, may depend in the pipe 8 nearly but not quite to the closed lower end of the latter.

The refractory block 3 is provided with another vertical bore 9 and a half-round groove 10 as a downward extension thereof in the left hand portion of such skimmer block as shown in Fig. 1 for the accommodation of a second cooler which is identical with that just described and therefore requires no further description.

The exact relation of the level of the lower ends of the pipes 8 to that of the lower end surface of the refractory block is not critical and may vary somewhat from that shown where both are immersed in the glass or the coolers are sufficiently close to the glass between the side edges of the lower end portion of the skimmer block and the adjacent inner side walls of the flow channel to have the desired cooling effect on such glass.

In use, the pipe 13 communicating with the interior of the T 12 around the inner pipe 15 may serve as the intake or supply pipe for a cooling fluid, such as water, which may be obtained by suitable connection with any suitable source of supply. This water then will be circulated through the pipe 8 and out the inner pipe through connected pipe 17 which then constitutes the return or exhaust line. Obviously, the direction of circulation might be reversed and the water might be introduced through the inner pipe and out the outer pipe, the functions of these then being exchanged.

Should wear of the immersed portion of the skimmer block between the coolers be such as to necessitate removal of the skimmer block or should such removal or replacement by a new block be required for any reason, the coolers may be removed simply by lifting them from the applied positions, the pipes 8 moving readily out of the glass and upwardly through the bores 9. Of course, any connections (not shown) of the pipes 13 and 17 may be suitable to permit such bodily movement of the coolers. After the glass next to the skimmer block has sufficiently reheated, the skimmer block may be withdrawn and replaced by a new one. The coolers may be applied to the skimmer block either before or after it has been installed.

The coolers may be made of ordinary steel or iron pipe. The flow of a cooling fluid therethrough may be regulated by any suitable available known means, as by appropriate valves, none shown, in the supply lines.

Many changes in and modifications of the specific illustrative embodiment of the invention shown in the drawings and herein particularly described will now become obvious to or suggest themselves to those skilled in the art and I, therefore, do not wish to be limited to the details of this embodiment.

I claim:

1. A skimmer for a molten glass stream in a refractory flow channel having side walls extending above the level of the glass stream, comprising a transversely disposed refractory block having an upper portion projecting above said side walls and supported thereon and a lower portion depending between said side walls to at least the surface of the glass stream and having side edges spaced from the side walls of the channel, and cooling fluid circulating coolers comprising vertical cooling pipes closed at their lower ends and associated with the side edges of said depending lower portion of the skimmer block so as to fit across the spaces between said side edges and the adjacent side walls of the channel and to subject the glass of the stream therebetween to a localized cooling action sufficient to stop flow thereof and thereby obviate erosion by the glass of the glass contacted side edges and adjacent surfaces of the channel side walls.

2. A skimmer as defined by claim 1 wherein said coolers are separably associated with said skimmer block so as to be removable from the channel independently of the block so that the latter may be left therein after removal of the coolers until the cooled glass in contact therewith has reheated sufficiently to free the block for removal from the channel.

3. A skimmer as defined by claim 1 wherein the upper portion of the skimmer block partially overlies and rests upon the side walls of the channel and is provided with vertical bores having axes lying in the planes of the side edge faces of the lower portion of said block and continuing downwardly in said side edge faces as vertical groove extensions of said bores and wherein said vertical pipes extend through said bores and are partially disposed in the groove extensions thereof and partially projecting from said grooves toward the adjacent side walls of the channel.

4. A skimmer as defined by claim 3 wherein flanges engaged with said pipes rest upon the upper surfaces of said block and support the pipes in operative association with the side edge faces of the block and wherein said coolers further include vertical inner pipes open at their lower ends and disposed within the first named pipes in spaced relation thereto, together with fluid supply and return pipes operatively connected to the upper ends of the outer and inner pipes, respectively.

5. A skimmer as defined by claim 4 wherein said outer pipes are of metal and of circular cross-sectional configuration and said bores are of suitable cross-sectional configuration and size to permit said outer pipes to be slid axially therethrough and said grooves are of suitable cross-sectional configuration and size to accommodate approximately longitudinal half portions of the portions of the outer pipes associated therewith.

MADISON M. CANNON, Jr.

REFERENCES CITED

The following references are of record in the file of this patent:

UNITED STATES PATENTS

| Number | Name | Date |
| --- | --- | --- |
| 1,641,898 | Neenan | Sept. 6, 1927 |